(12) United States Patent
Graumann (10) Patent No.: US 6,928,161 B1
(45) Date of Patent: Aug. 9, 2005

(54) ECHO CANCELLATION APPARATUS, SYSTEMS, AND METHODS

(75) Inventor: David L. Graumann, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 09/584,576

(22) Filed: May 31, 2000

(51) Int. Cl.[7] .............................................. H04B 3/23
(52) U.S. Cl. .............................. 379/406.08; 379/390.02
(58) Field of Search ..................... 379/388.01–390.04, 379/406

(56) References Cited

U.S. PATENT DOCUMENTS

| | | | | |
|---|---|---|---|---|
| 5,131,011 A | * | 7/1992 | Bergmans et al. | 375/348 |
| 5,343,522 A | * | 8/1994 | Yatrou et al. | 379/406.09 |
| 6,044,150 A | * | 3/2000 | Rigstad et al. | 379/387.02 |

FOREIGN PATENT DOCUMENTS

WO    WO-9715124    *   4/1997    ............ H04B 3/23

OTHER PUBLICATIONS

STMicroelectronics, ST75C530/ST75C540 Specification, Feb. 1999, pp. 1, 15, 17.*

* cited by examiner

Primary Examiner—Forester W. Isen
Assistant Examiner—Daniel Swerdlow
(74) Attorney, Agent, or Firm—Schwegman, Lundberg, Woessner & Kluth, P.A.

(57) ABSTRACT

An echo cancellation unit includes a model store to store a current echo model from an adaptive filter when a real-time error occurs. The real-time error is detected by monitoring a convergence metric. In some embodiments, the convergence metric is echo return loss enhancement (ERLE). When a real-time error occurs, the current echo model is saved, and the adaptive filter is reset such that it will begin converging from the origin. As a new model emerges in the adaptive filter, it is compared to the saved model in the model store at several time lags. If a match is found, the emerging model is replaced with the saved model at the appropriate time lag. The result is faster convergence of the adaptive filter than if the adaptive filter were left to converge on its own.

29 Claims, 5 Drawing Sheets

ECHO CANCELLATION APPARATUS, SYSTEMS, AND METHODS

FIELD

The present invention relates generally to echo cancellation systems, and more specifically to reconvergence of echo cancellation systems.

BACKGROUND OF THE INVENTION

Some speakerphones suffer from echo. The microphone picks up sound from the speaker, and the person on the far end hears a delayed version of his voice. Different approaches have been used in attempts to reduce the echo. These approaches typically rely on digital signal processors (DSPs) or other hardware implementations so that the data streams are guaranteed to be continuous. These systems are sometimes referred to as real-time systems because they process data at the rate received. Hardware solutions (such as DSPs) to the echo problem can be expensive.

Software can be used to implement echo cancellation systems. Historically, software systems have been designed such that they are guaranteed to run fast enough to be considered real-time systems. That is, the software environment is controlled sufficiently enough to guarantee that interrupts and other high priority tasks do not interfere with the real-time operation.

Echo cancellation systems using a general purpose operating system (OS) running on a PC could save costs, but because of real-time data delivery errors, can suffer from performance problems. When real-time data delivery errors occur, adaptive filters in echo cancellation systems can diverge and take a significant amount of time to reconverge. This makes the implementation of echo cancellation systems in computers that cannot guarantee uninterrupted real-time operation problematic.

For the reasons stated above, and for other reasons stated below which will become apparent to those skilled in the art upon reading and understanding the present specification, there is a need in the art for a method and apparatus to efficiently cancel echos when the continuity of data streams cannot be guaranteed.

DESCRIPTION OF EMBODIMENTS

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The method and apparatus of the present invention provide a mechanism for monitoring real-time errors of an adaptive filter in an echo cancellation system. When a real-time error is encountered, the current echo model in the adaptive filter is saved, and the adaptive filter is reset such that it begins to reconverge from the origin. As the adaptive filter is reconverging, the emerging model in the adaptive filter is compared against the saved model. If a match is found, the saved model is restored back to the adaptive filter, thereby providing for much faster reconvergence than if the adaptive filter reconverged completely on its own.

Figure 1:
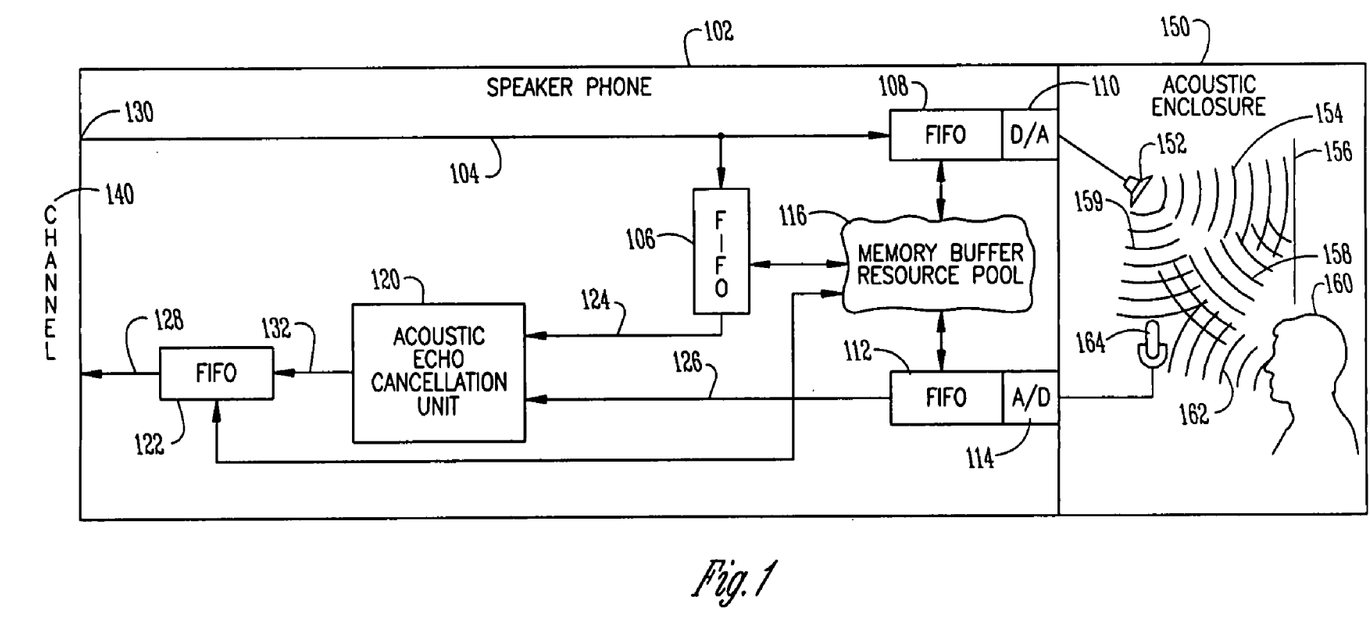
FIG. 1 shows an application of an echo cancellation system according to an embodiment of the present invention.

FIG. 1 shows an application of an echo cancellation system. Shown in FIG. 1 are speakerphone 102 and acoustic enclosure 150. Speakerphone 102 is a communications device that allows one or more users to talk on the phone at once. Speakerphone 102 can be stand-alone, or can be part of a larger system, such as a video conferencing system. Speakerphone 102 can be implemented in a device dedicated to communications, or can be part of a system that performs many other tasks, such as a general purpose computer. Acoustic enclosure 150, as shown in FIG. 1, represents the enclosure within which speakerphone 102 operates. For example, acoustic enclosure 150 can be a conference room, a car, or the like.

Speakerphone 102 has an output device that includes FIFO 108 and digital-to-analog converter (D/A) 110 coupled to a speaker 152. Speakerphone 102 also has an input device that includes analog-to-digital converter (A/D) 114 coupled to microphone 164. Speakerphone 102 drives speaker 152 to create acoustic signal 154 in acoustic enclosure 150. Acoustic signal 154 bounces off obstruction 156, to create echo signal 158. Microphone 164 receives spoken acoustic signal 162 from user 160, direct path signal 159, and also receives echo signal 158.

Obstruction 156 is shown in FIG. 1 as a single, straight, obstruction such as a room divider or a wall. In practice, obstructions within acoustic enclosure 150 contributing to echo signal 158 are many and varied. For example, many acoustic enclosures include conference tables, chairs, people, projectors, projection screens, and the like. As a result, echo signal 158 can include multiple echo components when it reaches microphone 164.

Speakerphone 102 is coupled between channel 140 and acoustic enclosure 150. Voice data received by speakerphone 102 from channel 140 is played by speaker 152, and signals recorded by microphone 164 (with some modifications described below) are transmitted onto channel 140 by speakerphone 102. Channel 140 can be any type of channel capable of carrying voice data. For example, in some embodiments, channel 140 is a normal telephone line, and in other embodiments, channel 140 is a packet switched network such as the Internet. Speakerphone 102, and its internal mechanisms, are now described.

Speakerphone 102 receives data from channel 140 on reference node 104. In some embodiments, data is received a single data sample at a time. In other embodiments, multiple data samples are received at once. For example, in some embodiments, packets that include multiple data samples are received on reference node 104. Any number of data samples can be received and held on reference node 104 without departing from the scope of the present invention. Data on reference node 104 is input to FIFO 106 and FIFO 108. Node 124 has data from reference node 104 delayed by FIFO 106, and FIFO 108 drives D/A 110 which in turn drives speaker 152 as previously described.

A/D 114 receives a signal from microphone 164. The signal received from microphone 164 includes components from spoken signal 162 and echo components such as direct path signal 159 and echo signal 158. A/D 114 drives FIFO 112, which in turn outputs data on node 126. Node 126 provides data to acoustic echo cancellation unit 120, as does node 124.

Data on node 126 has two components. One component includes information from spoken signal 162. The other component includes information from reference node 104 delayed by FIFOs 108 and 112, and also delayed by the acoustic path traversed by acoustic signal 154 and echo signal 158. When both components are passed from speakerphone 102 to channel 140, the user on the far end hears an echo of his voice. Speakerphone 102, and more specifically, acoustic echo cancellation unit 120, attempts to separate the two components and only pass the spoken signal 162 to channel 140.

Acoustic echo cancellation unit 120 includes an adaptive filter that models acoustic enclosure 150, such that after a period of time sufficient for the adaptive filter to converge, a close approximation of acoustic enclosure 150 exists within acoustic echo cancellation unit 120. After having converged, the adaptive filter utilizes information from node 124 to remove a large amount of undesirable echo contributed by direct path signal 159 and echo signal 158 from data on node 126. Acoustic echo cancellation unit 120 drives data onto node 132 that represents, to the greatest extent possible, spoken signal 162 alone.

The adaptive filter within acoustic echo cancellation unit 120 relies on a fixed timing relationship between data present on nodes 124 and 126. If a large change is made within acoustic enclosure 150, such as obstruction 156 being moved a large distance, the timing relationship between data on nodes 124 and 126 can be changed significantly. As a result, the adaptive filter within acoustic echo cancellation unit 120 can diverge. In this scenario, the adaptive filter reconverges over time to learn the new model of acoustic enclosure 150.

If data coming from channel 140 is interrupted, or if any of FIFOs 106, 108, and 112 are overrun or underrun, the timing relationship between data on nodes 124 and 126 can change. This phenomenon is termed a "real-time data error." In some embodiments, when FIFO 108 experiences a real-time error, data is synthesized to fill the gap produced by the lost data. For example, if FIFO 108 overruns, incoming data on reference node 104 will be lost. FIFO 108 can synthesize data samples to use in place of the lost data. In other embodiments, data is not synthesized, and instead, the latency of some samples between reference node 104 and D/A 110 changes.

The adaptive filter within acoustic echo cancellation unit 120 will diverge as a result of a real-time data error, but this scenario is different from the one previously described in which a change has taken place within acoustic enclosure 150. When a real-time error occurs, the adaptive filter may still accurately describe acoustic enclosure 150, but a divergence results from the real-time data error nonetheless. The method and apparatus of the present invention exploit the fact that the adaptive filter continues to accurately describe acoustic enclosure 150. This is described in greater detail with reference to the remaining figures.

In some embodiments, speakerphone 102 is implemented in hardware such that FIFOs 106, 108, and 112 do not overrun or underrun. In these embodiments, however, timing errors can still be caused by uncertainties of channel 140. For example, if channel 140 is not a reliable streaming environment, on-time delivery of data cannot be guaranteed. The Internet is one example of an unreliable streaming environment. In these types of environments, it is possible that packets can be late or missing completely.

In other embodiments, speakerphone 102 is implemented in a combination of hardware and software within a computer such as a PC, Unix workstation, or the like. In these embodiments, FIFOs 106, 108, and 112 can be implemented using memory structures under the control of a general-purpose operating system. This is shown diagrammatically by the presence of memory buffer resource pool 116. Memory buffer resource pool 116 represents the computer memory resources available for allocation to data structures that implement the data flow in speakerphone 102. In some embodiments, memory buffer resource pool 116 is a memory heap managed by a general purpose operating system. In other embodiments, memory buffer resource pool 116 is a portion of memory allocated to a process or task in a multitasking computing environment.

Memory buffer resource pool 116 is shown coupled to FIFOs 106, 108, 112, and 122 because in some software embodiments, data storage for the FIFOs is allocated from memory buffer resource pool 116 when needed, and deallocated after use. In these embodiments, FIFOs 106, 108, 112, and 122 do not exist as discrete elements; rather, they are allocated and deallocated as necessary from memory buffer resource pool 116.

When a very fast computer implements speakerphone 102, and no other higher priority processes are currently being run by the same computer, FIFOs 106, 108, 112, and 122 generally do not overrun or underrun as a result of the software implementation. In some embodiments however, other high priority processes can cause uncertain timing relationships such that the FIFOs can underrun or overrun. Likewise, memory buffer resource pool 116 is a finite resource of memory, and when the resource is exhausted, some data may be lost.

Data flow in a software embodiment is now described to illustrate the limitations of the finite memory resource of memory buffer resource pool 116. Data is received from channel 140 at node 130 onto reference node 104. This can be performed in an interrupt routine that receives data from a hardware resource coupled to channel 140. The routine allocates memory from memory buffer resource pool 116 to hold data on reference node 104. When data from reference node 104 is input to FIFOs 106 and 108, memory is allocated from memory buffer resource pool 116 to increase the size of FIFOs 106 and 108. Likewise, when a data sample from FIFO 108 is transferred to D/A 110, a memory location may be deallocated and returned to memory buffer resource pool 116.

When FIFO 112 receives data from A/D 114, memory is allocated from memory buffer resource pool 116, and when data is transferred from FIFO 112 to node 126, the memory location is deallocated and returned to memory buffer resource pool 116. FIFO 122 operates in the same manner, in that memory is allocated when a data sample enters FIFO 122, and memory is deallocated when a data sample leaves FIFO 122. In general, as data travels between nodes 130 and D/A 110, and between A/D 114 and node 128, memory is allocated and deallocated from memory buffer resource pool 116. As stated above, real-time data errors can result if the finite memory resources of memory buffer resource pool 116 become exhausted, or if a higher priority task precludes the timely allocation of memory, thereby causing a loss of data.

Although the method and apparatus of the present invention is described with reference to echoes caused by an acoustic enclosure, they are also applicable to echoes caused by other mechanisms. For example, echoes caused by hybrids can also be canceled, and filters quickly reconverged, using the method and apparatus of the present invention.

Figure 2:
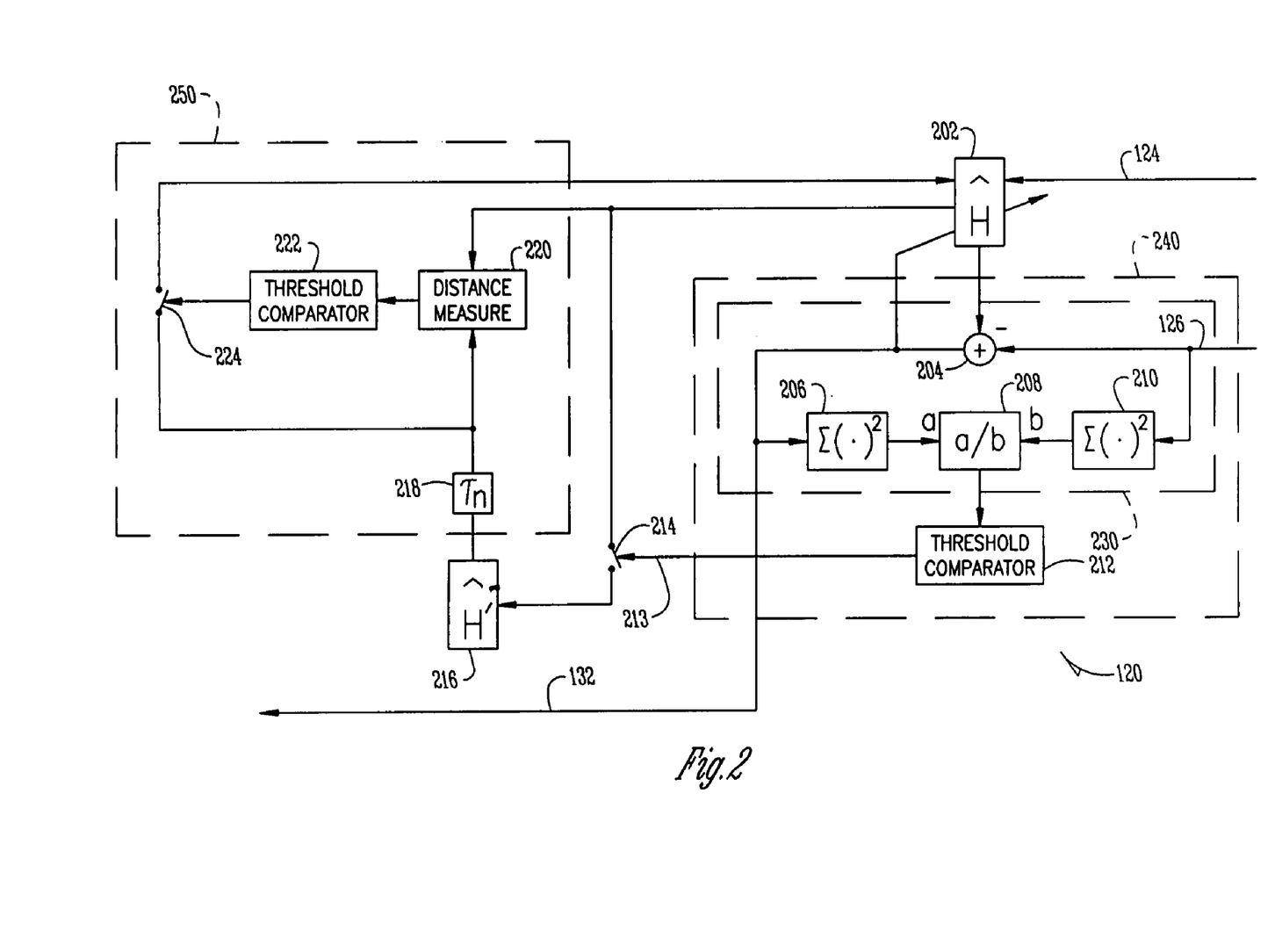
FIG. 2 shows an acoustic echo cancellation unit according to an embodiment of the present invention.

FIG. 2 shows an acoustic echo cancellation unit. Acoustic echo cancellation unit 120 operates to remove the echo signal as described above with reference to FIG. 1. When a real-time error occurs, acoustic echo cancellation unit 120 detects that the error has taken place, and then performs actions to quickly recover from the error. The real-time error is detected by monitoring the effectiveness of an adaptive filter within acoustic echo cancellation unit 120. If an error has occurred then a recovery process commences. The recovery process attempts to map pre-real-time error information to post-real-time error information. If a mapping can be made, then the pre-real-time error echo model is used to instantly reconverge the adaptive filter rather than allowing the adaptive filter to converge by the standard adaptive process.

Acoustic echo cancellation unit 120 includes adaptive filter 202, real-time error detection unit 240, model store 216, and fast reconvergence unit 250. Real-time error detection unit 240 includes convergence metric computation unit 230, and threshold comparator 212. Convergence metric computation unit computes a metric that shows a level of convergence of the adaptive filter 202.

Acoustic echo cancellation unit 120 receives data from reference node 104 on node 124, and data from the microphone on node 126. Node 124 is input to adaptive filter 202. Adaptive filter 202 outputs a signal that is a close approximation to the signal component representing the echo components from direct path signal 159 and echo signal 158 (FIG. 1). This echo component is subtracted from the microphone data on path 126. The result is placed on node 132, which is ultimately output to channel 140 (FIG. 1).

After adaptive filter 202 has converged, and the timing relationship is steady between data on nodes 124 and 126, the signal energy on node 132 is smaller than the signal energy on node 126, in part because the echo is being successfully removed by adaptive filter 202. When a real-time error occurs, such that the timing relationship between data on nodes 124 and 126 changes abruptly, adaptive filter 202 injects energy into the output signal, rather than removing energy from the output signal. This condition is detected by real-time error detection unit 240, and an indication thereof is output on node 213 to control switch 214.

Real-time error detection unit 240 includes convergence metric computation unit 230 and threshold comparator 212. Convergence metric computation unit 230 computes a convergence metric to determine the level of convergence of adaptive filter 202. Summer 210 computes the average power of the signal on node 126, and summer 206 computes the average power on node 132. Divider 208 computes the ratio of the power output from summer 206 to the power output from summer 210.

In some embodiments, summer 204 is included within adaptive filter 202 such that node 126 is an input to adaptive filter 202 and node 132 is an output from adaptive filter 202. In these embodiments, the average power generated by summer 210 can be viewed as the adaptive filter input power, and the average power computed by summer 206 can be viewed as the adaptive filter output power. When viewed in this manner, divider 208 computes the ratio of the adaptive filter output power to the adaptive filter input power.

The convergence metric computed by convergence metric computation unit 230 is related to echo return loss enhancement (ERLE). ERLE describes the amount of energy removed from the microphone signal. This is the amount of loss the adaptive filter provides in the speaker-room-microphone path before transmitting the signal to the remote end point. ERLE is defined as $10*\log[e(n)/y(n)]$. Where $e(n)$ is the audio signal after cancellation and $y(n)$ is the input microphone audio signal. ERLE can be used as a convergence metric. As ERLE drops, the adaptive filter is converging. ERLE as defined above is a negative number as long as speaker 152 is playing audio and the adaptive filter is removing echo.

The ERLE remains relatively constant after the original convergence provided there is no acoustic path change, and the speaker is playing audio. If speaker 152 is silent, and user 160 is speaking, the ERLE value approaches a value of zero because $e(n)$ is substantially equal to $y(n)$. In this scenario, acoustic echo cancellation unit 120 is neither removing nor adding energy to the signal on node 126.

If there is a real-time error that disturbs the timing relationship of the echo model with respect to the audio streams, then the ERLE will increase suddenly because $e(n)$ becomes large quickly. If $e(n)$ becomes larger than $y(n)$, then ERLE becomes positive. When the timing relationship is disturbed enough, the ERLE value diverges and the adaptive filter injects energy into the microphone rather than removing it. If the adaptive filter adds energy to the microphone path rather than removing it, then a real-time error has most likely occurred.

Threshold comparator 212 compares the output of divider 208 to a threshold. In some embodiments, the threshold is at or near a value of one such that a real-time error is detected when the adaptive filter output power is greater than the adaptive filter input power. In some embodiments, the comparator not only compares the output of divider 208 to a threshold, but also compares the rate at which it changes to a threshold rate. In these embodiments, a slow change indicates an acoustical change, whereas an abrupt change indicates a real-time error.

The effects of real-time errors on acoustic echo cancellation unit 120 are different from the effects of changes in acoustic enclosure 150. The change in acoustic enclosure 150 that causes a substantial change in ERLE does so because the existing model in the adaptive filter no longer describes the acoustic enclosure. In contrast, when a real-time error causes a substantial change in ERLE, the existing model in the adaptive filter still describes acoustic enclosure 150. The change in ERLE is not caused by an incorrect model, but instead is caused by the time shift of a data stream input to adaptive filter 202.

The method and apparatus of the present invention exploit the fact that the existing model in the adaptive filter still describes acoustic enclosure 150 even though a large change has occurred in ERLE, by saving the existing model in model store 216 for later reuse. The adaptive filter is reset so that it begins to converge anew, and after it has converged to a degree, it is compared against the saved model. If the two models match within a distance measure, the same model can be reused in the adaptive filter, thereby allowing much faster convergence.

When a real-time error is detected, real-time error detection unit 240 momentarily closes switch 214, and the current echo model is saved in model store 216 for use during a later "fast reconvergence" stage described below. In some embodiments, less than the entire echo model is saved to model store 216. In these embodiments, a window of filter coefficients representing a portion of the echo model is extracted from the adaptive filter, and the rest is discarded. The window includes filter coefficients that represent the direct path of coupling within the acoustic enclosure and reverberations following, or the "major signature." In some embodiments, the window is increased in size to include a number of earlier coefficients and later coefficients.

The direct path coupling between the speaker and microphone can be found by searching for a sharp onset of energy followed by secondary reflections that decay exponentially. In embodiments in which the secondary reflections decay significantly within approximately 64 milliseconds (msec), the major signature includes approximately 64 msecs of filter coefficients. To extract the major signature, coefficients prior to the onset can be discarded, and coefficients after the secondary reflections can also discarded, to create a time window about the major signature. In embodiments where the window includes coefficients prior to the onset and also includes coefficients representing a period of time after the onset, not all of the coefficients before and after the major signature are discarded.

In some embodiments, the signature is then up-sampled by a factor of at least two to allow for sub-sample matching against the emerging model. This can be useful in part because true echo paths are generated by continuous functions while the echo model used herein is discrete. When the echo path is re-learned, it is possible that the old model and the new model are skewed by a fractional sample delay. In this case, the models before and after the error will not match perfectly, even for a timing-invariant transfer function. To accommodate this possibility, the pre-error echo model is up-sampled. In some embodiments, the saved model is also normalized or attenuated to account for subtle recovery adjustments.

Fast reconvergence unit 250 includes delay 218, distance measurement unit 220, threshold comparator 222, and switch 224. The fast reconvergence process begins after a model has been saved in model store 216, and adaptive filter 202 has been reset and begins to retrain from the origin to try to determine the new echo model.

Distance measurement unit 220 compares the saved model in model store 216 to the emerging model in adaptive filter 202 at several different time lags. Delay 218 provides distance measurement unit 220 with time shifted versions of the saved model. Distance measurement unit 220 provides threshold comparator 222 with a distance measure. Threshold comparator 222 compares the distance measure to a threshold to determine if a match is found. In some embodiments, an output value greater than 0.7 (for Euclidean norm) is used to determine whether a match is found and the converging model should be replaced. If a match is found, then switch 224 is momentarily closed, and the saved model at the appropriate time lag is restored to adaptive filter 202. The result is a near-instantaneous reconvergence because the saved model still accurately describes the acoustic enclosure.

Distance measurement unit 220 can utilize one of many different distance measures. Examples include, but are not limited to, a Euclidian distance measure, matched filtering, correlation, or the like. Any method for matching waveforms can be employed without departing from the scope of the present invention. In some embodiments, a time domain normalized least mean square (NLMS) mechanism uses matched filtering between a selected portion of the echo path estimates. In some embodiments, comparisons are made over multiple saved signatures. This can be accomplished using a recursive least squares (RLS) algorithm. In some embodiments, distance measurements are made in the frequency domain rather than the time domain.

In some embodiments, prior to the emerging model being compared against the saved model, the emerging model is searched for the onset of the direct path coupling in substantially the same manner that the saved model was searched. The emerging model is extracted in the same manner that the saved model is extracted, and in some embodiments, is also up-sampled and normalized.

In some embodiments, the total amount of time lag that is used is something less than or equal to the size of the saved model. For example, if the saved model is 64 msecs in length, then the largest time shift is something less than 64 msecs. In some embodiments, convolution is performed over each shift value for a total of a ten msec shift.

In some embodiments, the above matching process does not commence until a recognizable echo model has begun to converge in adaptive filter 202. In some embodiments, if an ERLE of approximately −8 dB is being achieved, then the above matching method is attempted. If the saved model, which may have been achieving an ERLE more favorable than −25 dB, replaces the converging model at the designated lag, an instant improvement of 17 dB (−25 dB−(−8 dB)) is obtained in a single time sample. Even if there are slight misadjustments in the acoustical model between the converging model and the saved model (from time variant transfer function, time shift mis-alignment or the like) the convergence back to the pre-real-time error ERLE value will be significantly faster than converging from the origin, which could take several seconds.

Acoustic echo cancellation unit 120 can be implemented in hardware, in software, or in any combination thereof. In some embodiments, acoustic echo cancellation unit 120 is implemented in software along with other portions of speakerphone 102 (FIG. 1). In these embodiments, acoustic echo cancellation unit 120 provides a mechanism to quickly reconverge adaptive filter 202 after real-time errors have occurred as a result of finite resource limitations. In other embodiments, acoustic echo cancellation unit 120 is implemented in hardware along with other portions of speakerphone 102. In these embodiments, real-time errors may not occur as a result of finite resources within the implementation of speakerphone 102; however, real-time errors may still occur as a result of unreliable streaming environments. For example, real-time errors may occur when speakerphone 102 uses the Internet as channel 140 (FIG. 1). In these embodiments, acoustic echo cancellation unit 120 provides a mechanism to recover from real-time errors that occur as a result of the unreliable streaming environment.

Figure 3A:
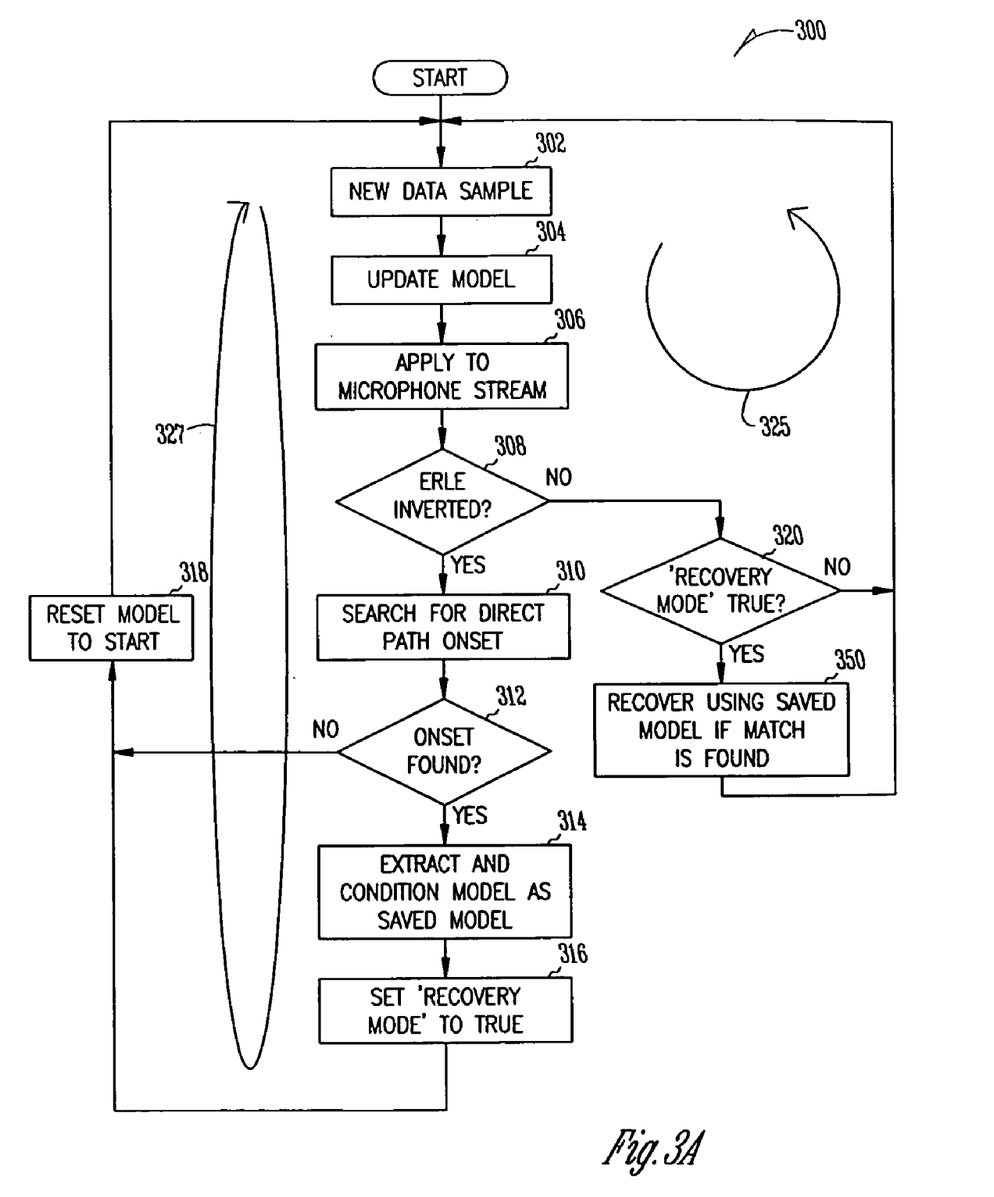
FIGS. 3A and 3B show a method for detection of real-time errors and fast reconvergence according to an embodiment of the present invention.
Figure 3B:
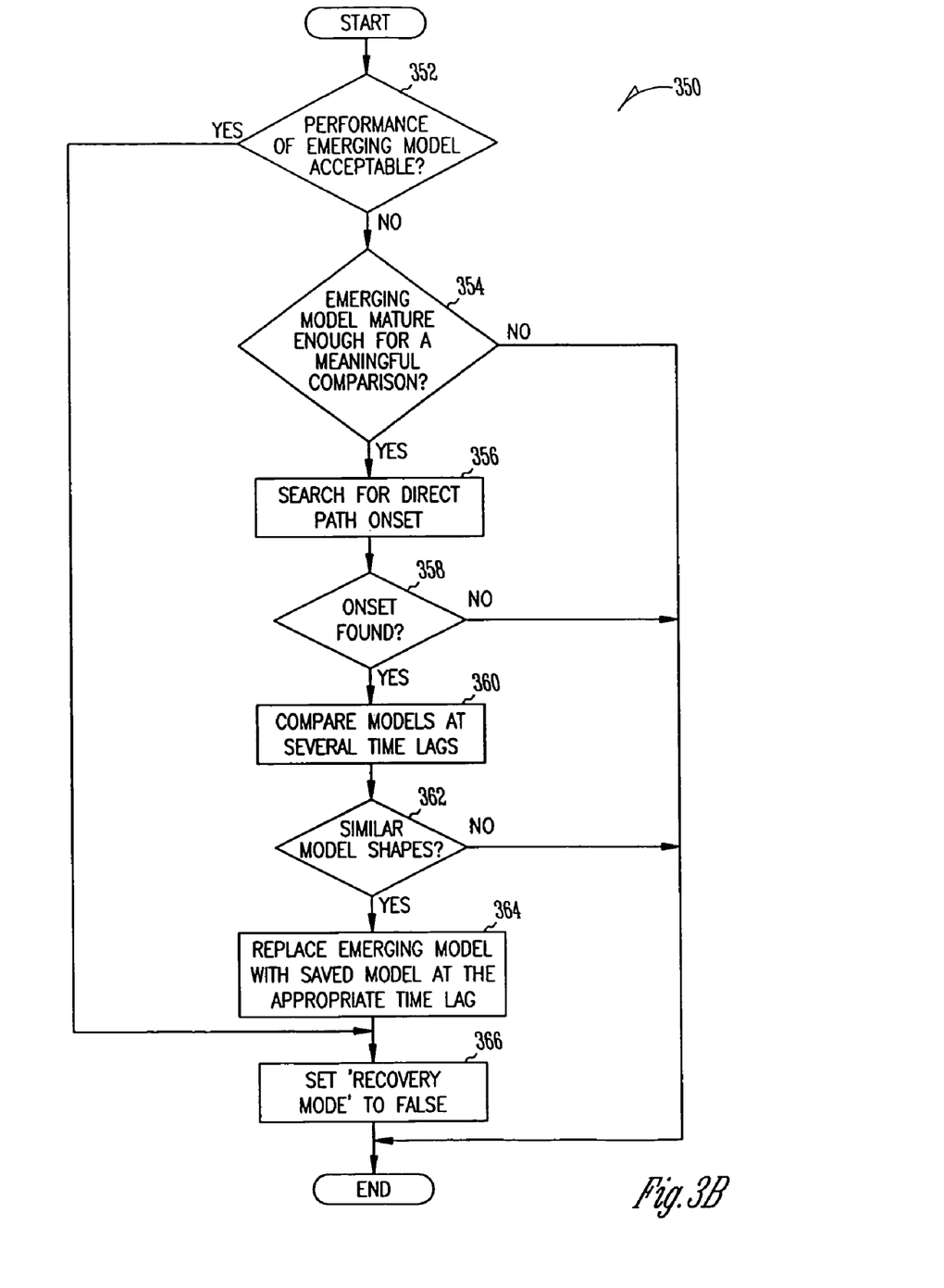

FIGS. 3A and 3B show a method for detection of real-time errors and fast reconvergence. Method 300, as shown in FIG. 3A, describes a method to detect real-time errors and save an acoustical model for fast reconvergence. Method 300 describes the operation of a speakerphone and an acoustic echo cancellation unit such as those shown and described in the previous figures. In embodiments implemented solely in hardware, method 300 describes the operation of the hardware embodiment. Alternatively, in embodiments utilizing hardware and software, method 300 describes the operation and interaction of both the hardware and software.

Method 300 begins in action 302 when a new data sample is received from a channel. In some embodiments, a packet of data samples is received, and in other embodiments, multiple packets of data samples are received in action 302. The remainder of method 300 is described as if a single data sample is received. Action 302 corresponds to the data sample arriving on node 124 (FIG. 2). In action 304, the adaptive filter model that describes the echo path is updated using the data sample received in action 302. This corresponds to adaptive filter 202 receiving and processing data on node 124. In action 306, the model results are applied to data on the microphone stream. In the embodiment shown in FIG. 2, action 306 corresponds to the action of summer 204 which subtracts the output of adaptive filter 202 from data on node 126.

In decision block 308, an ERLE value is computed and checked for an inversion. As described above with reference to FIG. 2, ERLE is related to the metric computed by the combination of summers 206 and 210, and divider 208. An inversion of sign in ERLE corresponds to the output of divider 208 transitioning from a number smaller than one to a number greater than one. When the sign of the ERLE value inverts and becomes positive, control is transferred to decision block 310. In contrast, if the ERLE value is not inverted, control is transferred to decision block 320. Decision block 320 determines if the method is in a recovery mode, and if not, control returns to action 302 where another data sample is received. The method enters a recovery mode as a result of an action described with reference to a different portion of method 300.

The portion of method 300 described thus far falls on path 325. When a real-time error or has not occurred, and the adaptive filter has remained in a state of convergence, method 300 continually traverses path 325. For as long as the ERLE value does not invert, and the method has not entered a recovery mode, new data samples are received, the adaptive filter updates the current echo model, and the echo signal is substantially removed from data received from the microphone.

Method 300 leaves path 325 when decision block 308 determines that the ERLE value has inverted. In action 310, the process of saving the current echo model from the adaptive filter begins. Within the echo model stored in the adaptive filter, a search is performed for the onset of the direct path. This corresponds to the portion of the echo model that describes the shortest acoustical echo path. For example, in the embodiment of FIG. 1, the shortest acoustical path between speaker 152 and microphone 164 is shown as acoustical signal 159.

Decision block 312 determines whether the onset is found from the search in action 310. If the onset is not found, then the adaptive filter does not have a useful model. In this case, the model is reset in action 318, and method 300 begins over. If the onset of the direct path is found, the current model within the adaptive filter is extracted, conditioned, and saved. In some embodiments, the model is extracted by saving only those coefficients describing the direct path and reverberations lasting for a period of time. In some embodiments, the model is conditioned by up-sampling and attenuating. These and other extraction and conditioning techniques are described above with reference to FIG. 2.

Action 316 puts method 300 into a recovery mode. "Recovery mode" refers to a mode where a saved model exists. The saved model may be used for a quick recovery and fast reconvergence of the adaptive filter. The adaptive filter is reset in action 318, and method 300 begins again.

The actions just described fall on path 327. When path 327 is traversed, the ERLE value has been inverted, the current model has been saved as a saved model in a model store, the adaptive filter has been reset so that it will begin to converge anew, and the method has been put in a recovery mode. On the next traversal of method 300, the ERLE value will not be inverted and control will transfer to decision block 320. Path 325 will not be traversed as described previously, because now the method is in a recovery mode. Instead, action 350 attempts to recover using the saved model if a match can be found between the emerging model of the adaptive filter and the saved model in the model store.

If action 350 is successful, the saved model is restored to the adaptive filter, possibly with a time lag offset, resulting in faster reconvergence of the adaptive filter than if the adaptive filter were left to converge on its own. The details of action 350 are shown in FIG. 3B.

FIG. 3B shows details of action 350. Action 350 begins with decision block 352 when emerging model performance is checked for acceptability. The emerging model referred to in action 352 is the newly converging model in the adaptive filter. In some embodiments, a convergence metric computation unit determines a metric that measures the performance of the adaptive filter. For example, in the embodiment of FIG. 2, convergence metric computation unit 230 can be used to check the performance of the emerging model. In other embodiments, the ERLE value can be computed and checked to determine the acceptability of the emerging model. If an emerging model has achieved an ERLE value that is not likely to be quickly improved by the replacement of the emerging model with the saved model, then the performance of the emerging model is deemed acceptable, and control transfers to action 366 where the method is removed from the recovery mode. When the unit is removed from a recovery mode in action 366, action 350 ends and method 300 (FIG. 3A) begins anew. Method 300 then traverses path 325 continuously as previously described.

When the performance of the emerging model is not found to be acceptable in decision block 352, control is transferred to decision block 354. In decision block 354, the maturity of the emerging model is checked to see if a meaningful comparison can be made against the saved model. For example, if the adaptive filter has processed but a few data samples, the emerging model has not matured significantly, and the result of any comparison may not be meaningful. Emerging model maturity can be checked using the ERLE value or any other convergence metric. When the emerging model is not mature enough, action 350 ends and method 300 (FIG. 3A) continues. If the model is mature enough, then the process of comparing the saved model to the emerging model begins. In some embodiments, an ERLE value of approximately −8 dB signifies that the emerging model is mature enough to be meaningful.

In action 356, the emerging model is searched for a direct path onset. If the onset is found, decision block 358 continues with action block 360, and if the direct path onset is not found, action 350 ends. Action 360 compares the emerging model and the saved model at several time lags. If the models have similar shapes at any time lag, decision block 362 transfers control to action block 364, where the saved model replaces the emerging model in the adaptive filter. Because the saved model and the emerging model matched at a particular time lag value, the saved model is restored to the adaptive filter at that time lag.

Action 366 removes the method from recovery mode, and action 350 ends. Action 350 provides for faster reconvergence of an adaptive filter when a saved model substantially describes the newly emerging model in the adaptive filter. As described above with reference to FIG. 2, a large increase in ERLE can be achieved by the actions shown in FIG. 3B.

Figure 4:
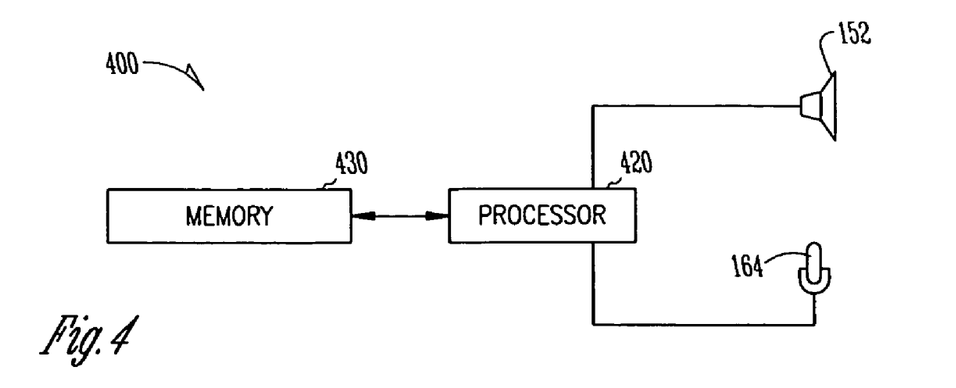
FIG. 4 shows a processing system according to an embodiment of the present invention.

FIG. 4 shows a processing system. Processing system 400 includes processor 420 and memory 430. In some embodiments, processor 420 represents a computer that implements a speakerphone such as speakerphone 102 (FIG. 1), or an acoustical echo cancellation unit such acoustic echo cancellation unit 120 (FIG. 2). In some embodiments, processor 400 is a processor capable of executing software embodiments of methods, such as those shown in FIGS. 3A and 3B. Processing system 400 can be a personal computer (PC), mainframe, handheld device, portable computer, set-top box, or any other system that includes software. Shown coupled to processor 420 are speaker 152 and microphone 164.

Memory 430 represents an article that includes a machine readable medium. For example, memory 430 represents any one or more of the following: a hard disk, a floppy disk, random access memory (RAM), read only memory (ROM), flash memory, CDROM, or any other type of article that includes a medium readable by processor 420. Memory 430 can store instructions for performing the execution of the various method embodiments of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An echo cancellation unit comprising:
an adaptive filter to generate a current echo model;
a convergence metric computation unit; and
a model store;
wherein the convergence metric computation unit detects an increase in error signal energy due to a data processing or transmission error and in response produces an indication that causes the model store to store the current echo model from the adaptive filter as a saved model before resetting the adaptive filter.

2. The echo cancellation unit of claim 1 further comprising:
a distance measurement unit to measure a distance between the current echo model and the saved model; and
a threshold comparator responsive to the distance measurement unit to facilitate restoring the saved model as the current echo model.

3. The echo cancellation unit of claim 2 wherein the distance measurement unit is coupled between the adaptive filter and the model store to facilitate a distance measurement between the current echo model and the saved model for a plurality of time lags.

4. The echo cancellation unit of claim 1 wherein the current echo model in the adaptive filter has a plurality of coefficients, and wherein the model store stores a subset of the plurality of coefficients.

5. The echo cancellation unit of claim 1 further comprising a reconvergence unit to restore the saved model as the current echo model.

6. The echo cancellation unit of claim 5 wherein the reconvergence unit comprises:
a distance measurement unit to compare the current echo model and the saved model over a plurality of time lags; and
a comparator coupled to the distance measurement unit, to restore the saved model as the current echo model at a matching time lag.

7. The echo cancellation unit of claim 1 wherein the data processing or transmission error includes at least one of data loss and delayed data.

8. A speakerphone system comprising:
an output device to drive a speaker, the output device being responsive to a reference node coupled to a communications channel;
an input device responsive to a microphone; and
an echo cancellation unit coupled to the reference node and the input device, such that the echo cancellation unit utilizes data from the reference node to remove echo from a signal received at the microphone;
wherein the echo cancellation unit includes a model store to store a current echo model before resetting the current echo model when an increase in error signal energy due to a data processing or transmission error occurs.

9. The speakerphone system of claim 8 wherein the speakerphone system is implemented in a computer, and wherein the echo cancellation unit is implemented in software, the echo cancellation unit being coupled to the input device and to the reference node using memory in the computer.

10. The speakerphone system of claim 8 wherein the echo cancellation unit further includes a real-time error detector to detect when the data processing or transmission error has occurred, and to direct the model store to receive the current echo model, to create a saved model, wherein the system further comprises a FIFO, wherein the data processing or transmission error includes at least one of data interruption, delayed data, lost data, a data timing error, a streaming error, and the FIFO at least one of overruns and underruns.

11. The speakerphone system of claim 10 wherein:
the echo cancellation system includes an adaptive filter having an input power and an output power; and
the real-time error detector is coupled to the adaptive filter to compare the input power and the output power of the adaptive filter.

12. The speakerphone system of claim 10 wherein the echo cancellation unit further includes a reconvergence unit to compare the current echo model with the saved model.

13. The speakerphone system of claim 12 wherein the reconvergence unit is coupled between the model store and the adaptive filter to compare the current echo model with the saved model for a plurality of time lags, and to conditionally replace the current echo model with the saved model at a matching time lag.

14. The speakerphone system of claim 10 wherein echo return loss enhancement is measured by the real time error detector, and wherein the data processing or transmission error is detected when an inversion in echo return loss enhancement occurs abruptly.

15. A method comprising:
reconverging an adaptive filter using computer implementation, wherein the reconverging includes:
storing an echo model from the adaptive filter to create a stored model before resetting the adaptive filter when a data timing error occurs;

comparing a current model in the adaptive filter with the stored model, and replacing the current model with the stored model when a match is found within a distance measure;

determining a convergence metric value that describes a level of convergence of the adaptive filter; and comparing the current model with the stored model when the convergence metric value is above a threshold.

16. The method of claim 15 wherein determining the convergence metric value comprises computing a ratio of adaptive filter output power to adaptive filter input power, wherein the data timing error includes at least one of data interruption, delayed data, lost data, a real-time data error, and a streaming error.

17. The method of claim 15 further comprising:

comparing an adaptive filter output power to an adaptive filter input power; and when the adaptive filter output power is greater than the adaptive filter input power, recognizing that the data timing error has occurred.

18. A method comprising:

reconverging an adaptive filter using computer implementation, wherein the reconverging includes:

comparing a current model in the adaptive filter with a stored model, and replacing the current model with the stored model when a match is found within a distance measure, wherein comparing comprises:

normalizing the stored model;

normalizing the current echo model; and measuring a Euclidean distance between the stored model and the current echo model.

19. The method of claim 18 further comprising:

measuring echo return loss enhancement; and when the echo return loss enhancement inverts, recognizing that a data interruption has occurred.

20. The method of claim 18 further comprising:

comparing an adaptive filter output power to an adaptive filter input power; and when the adaptive filter output power is greater than the adaptive filter input power, recognizing that a streaming data interruption error has occurred.

21. A method comprising:

recognizing an occurrence of a data processing or transmission error; and reconverging an adaptive filter, wherein recognizing and reconverging include:

detecting the data processing or transmission error;

saving a current echo model in the adaptive filter as a saved model in a model store;

resetting the adaptive filter such that convergence begins anew;

comparing an emerging echo model in the adaptive filter to the saved model; and replacing the emerging echo model with the saved model when a match is found.

22. The method of claim 21 wherein detecting the data processing or transmission error comprises:

comparing an adaptive filter output power to an adaptive filter input power; and when the adaptive filter output power is greater than the adaptive filter input power, recognizing that the data processing or transmission error has occurred.

23. The method of claim 21 wherein detecting the data processing or transmission error comprises:

measuring echo return loss enhancement; and when the echo return loss enhancement inverts, recognizing that the data processing or transmission error has occurred abruptly.

24. The method of claim 21 wherein saving the current echo model comprises searching the current echo model for a portion that includes a direct path and reverberations, and saving the portion as the saved model.

25. The method of claim 21 wherein comparing the emerging echo model with the saved model comprises:

for each of a plurality of time lags, computing a distance between the emerging echo model and the saved model to find a matching time lag.

26. The method of claim 25 wherein replacing comprises replacing the emerging echo model with the saved model shifted by the matching time lag.

27. An article having a machine readable medium with instructions for performing a method of reconverging an adaptive filter disposed thereon, the method comprising:

saving a current echo model from the adaptive filter as a saved model in a model store when a data processing or transmission error occurs;

resetting the adaptive filter to start converging anew;

comparing an emerging echo model with the saved model; and replacing the emerging echo model with the saved model when a match is found.

28. The article of claim 27 wherein comparing the current echo model with the saved model comprises:

performing a distance measure between the emerging echo model and the saved model at a plurality of time lags.

29. The article of claim 27 further comprising:

prior to saving a current echo model, determining if the data processing or transmission error has occurred by comparing an adaptive filter output power to an adaptive filter input power.

* * * * *